United States Patent [19]
Matsumoto

[11] Patent Number: 6,057,813
[45] Date of Patent: May 2, 2000

[54] SINGLE CHIP MICROCOMPUTER HAVING A BUILT-IN ON SCREEN DISPLAY DEVICE

[75] Inventor: Seiji Matsumoto, Itami, Japan

[73] Assignee: Mitsubishi Denki Kabushiki Kaisha, Tokyo, Japan

[21] Appl. No.: 08/314,256

[22] Filed: Sep. 30, 1994

[30] Foreign Application Priority Data

Oct. 5, 1993 [JP] Japan ................................. 5-249270

[51] Int. Cl.[7] .................................................. G09G 1/16
[52] U.S. Cl. ............................... 345/26; 345/25; 348/563
[58] Field of Search ................................... 395/153, 154, 395/158, 161; 345/24, 25, 26, 27, 28, 29, 30; 348/563–570, 589

[56] References Cited

U.S. PATENT DOCUMENTS

| | | | |
|---|---|---|---|
| 5,303,048 | 4/1994 | Chiok ........................................ | 348/607 |
| 5,325,183 | 6/1994 | Rhee ........................................ | 348/528 |
| 5,343,249 | 8/1994 | Moon ........................................ | 348/564 |
| 5,367,317 | 11/1994 | Hosotani ................................. | 345/193 |
| 5,386,238 | 1/1995 | Kinghou et al. ......................... | 348/468 |
| 5,396,297 | 3/1995 | Shindou et al. ......................... | 348/569 |
| 5,420,610 | 5/1995 | Takahashi ............................... | 345/195 |
| 5,428,405 | 6/1995 | Lee ......................................... | 348/731 |
| 5,438,375 | 8/1995 | Sasabe et al. ........................... | 348/706 |
| 5,438,377 | 8/1995 | Chang .................................... | 348/731 |

FOREIGN PATENT DOCUMENTS 5-2209  1/1993  Japan .

*Primary Examiner*—Ba Huynh
*Attorney, Agent, or Firm*—McDermott, Will & Emery

[57] ABSTRACT

A microcomputer has a plurality of on screen display devices in one chip. Under control of a CPU, display tasks are respectively controlled in the on screen display devices in an independent manner, thereby obtaining a desired display screen on which the display tasks are simultaneously displayed. The microcomputer has a function of controlling priorities of display of the display tasks, and that of controlling occurrence of interrupt and existence of a mask in display of the display tasks. A desired display screen on which the display tasks are simultaneously displayed is obtained by combining these control functions.

4 Claims, 12 Drawing Sheets

▨ : BLOCK FOR TELETEXT DISPLAY
       (THIRD,FOURTH BLOCK)

☐ : BLOCK FOR CHANNEL SELECTION
       DISPLAY (FIRST,SECOND BLOCK)

SINGLE CHIP MICROCOMPUTER HAVING A BUILT-IN ON SCREEN DISPLAY DEVICE

BACKGROUND OF THE INVENTION

1. Field of the Invention

The invention relates to a single chip microcomputer having a built-in on screen display device (hereinafter, often abbreviated as "OSD") which, when characters, numerals, or the like are to be displayed on a display such as a CRT, simultaneously conducts control of screen display as a television receiver for displaying a channel, a volume, etc., and control of screen display as a teletext receiver for displaying transmitted teletext data.

2. Description of Related Art

Conventionally, a viewer can set a screen of a television receiver to display characters, and/or patterns indicative of the operation state including a selected channel, and a volume. FIG. 1 is a block diagram showing the configuration of a conventional OSD incorporated in a single chip microcomputer which is used for such display (Japanese Patent Application No. 5-2209 (1993)). In FIG. 1, the reference numeral 16 designates a data bus connected to a central processing unit (hereinafter, abbreviated as "CPU") which is not shown. To the data bus 16, connected are a CRT control register 1 for controlling the ON/OFF state of a CRT, a vertical position register 2 to which the vertical position of the display start point is inputted, a character size register 3 to which data of sizes of fonts to be displayed are inputted, a horizontal position register 4 to which the horizontal position of the display start point is inputted, a display data RAM 5 for storing data of characters or patterns to be displayed, a CRT port control resister 6 for controlling an output circuit 12 which outputs RGB signals, a first mask mode register 13 for setting a mask canceling position when a masking function is used, and a second mask mode register 14 for setting a mask setting position. The reference numeral 7 designates an oscillator for generating a display clock signal for the entire OSD, 8 designates a display position controller for controlling display positions of characters or patterns, 9 designates a display controller for controlling the display operation, 10 designates a character ROM for storing font dot data, 11 designates a shift register for converting a parallel format into a serial format, and 15 designates a mask controller for outputting a mask signal in response to output signals from the first and second mask mode registers Next, the operation will be described. Referring to FIG. 1, the horizontal synchronizing signal (hereinafter, abbreviated as "HSYNC") and the vertical synchronizing signal (hereinafter, abbreviated as "VSYNC") are supplied to the display position controller 8. The oscillator 7 generates a predetermined frequency while being reset at each HSYNC. The output of the oscillator 7 is used as a basic display clock for the entire OSD, and supplied to the display position controller 8, the display controller 9 and the output circuit 12.

On the other hand, in response to instructions from the CPU, data for displaying desired characters or patterns are inputted through the data bus 16 to the registers and the display data RAM 5. Data in the CRT control register 1 are supplied to the display position controller 8, the display controller 9 and the output circuit 12, to control the ON/OFF state of the character display, etc. Data corresponding to the vertical and horizontal positions at which the character display is to be started are previously inputted to the vertical position register 2 and the horizontal position register 4, and data corresponding to the sizes of fonts to be displayed are previously inputted to the character size register 3. These data are supplied to the display position controller 8. The RGB outputs from the output circuit 12 are controlled depending on the contents of the CRT port control register 6. In the display data RAM 5, addresses are arranged in accordance with the sequence of the character display, and data of characters to be displayed are inputted in the sequence of the addresses. Data stored in the display data RAM 5 include character code data, color code data, display mode data (hereinafter, referred to as "attribute code data"), etc. The attribute code data include data for character modifications such as a blink of displayed characters (blinking), and a display of an underscore.

The display position controller 8 compares the contents of the vertical position register 2 with the count value of the HSYNC, and the contents of the horizontal position register 4 with the count value of the display clock from the oscillator 7. When the two values of each combination coincide with each other, a display enabling signal is issued to the display controller 9, whereby the display controller 9 is activated to start a series of the following operations for displaying characters. First, the display controller 9 supplies the display data RAM 5 with the value which is obtained by counting the character number in the horizontal direction on the basis of the display clock. From the display data RAM 5, character code data, color code data and attribute code data are then outputted in the sequence of display. The color code data and the attribute code data are directly sent to the output circuit 12, and the character code data are supplied to the character ROM 10 so that the corresponding addresses of the character ROM 10 are decoded and font dot data corresponding to the character code data are outputted.

As shown in FIG. 2, for example, one font consists of picture elements of t×m dots. When the character ROM 10 stores such fonts for n characters, therefore, the character ROM 10 has a capacity corresponding to t×m×n dots. The font data read out from the character ROM 10 which are in a parallel format are converted by the shift register 11 into a serial format, and then supplied to the output circuit 12. In addition to the font data, the output circuit 12 receives from the display data RAM 5 the color code data indicative the character color and the background color, and the attribute code data, and conducts the display control on ordinary font data in accordance with the display mode which is indicated by the color code data and the attribute code data. In this way, the output circuit 12 outputs RGB signals, and desired characters or patterns are displayed on a screen in accordance with these signals.

Dot data of a font are stored in the unit of the number of dots arranged in the width direction, in areas of addresses of the character ROM 10 which are produced by decoding the character code data indicative of the font. In the case of FIG. 2, font data of t dots in the longitudinal direction are stored in the unit of one line at t addresses.

When the addresses are indicated in the sequence starting from the upper end by $AD_1, AD_2, AD_3, AD_4, \cdots, AD_{t-1}$, and $AD_t$, dot data are outputted in this sequence from the character ROM 10. The display position controller 8 counts the line number (1 to t) in the longitudinal direction of one character, and sequentially outputs dot data of each line of a display character. These operations are repeated for each of 1 to t lines to complete the character display of one block.

The display position will be described in detail. In FIG. 3 which shows an example of a display screen, the reference numeral 17 designates a display screen for displaying first to fourth display blocks 18 to 21. When a character string to be displayed is defined as one display block, the OSD has a plurality of display blocks in the form of a hardware. Addresses for storing a character code, a color code and an attribute code are assigned to each character in the display blocks. In the following, an example where a screen display using four display blocks is conducted will be described. The vertical position register 2 is preset so that the blocks are displayed in the sequence of the first display block 18→the second display block 19→the third display block 20→the fourth display block 21 (the vertical display start positions are set to be CV1 to CV4, respectively). When the process reaches the vertical display start position CV2 of the second display block 19 in the course of the display of the first display block 18, the last-first control is applied so that the display of the first display block 18 is stopped in the middle and the display of the second display block 19 is started. When the process then reaches the vertical display start position CV3 of the third display block 20 in the course of the display of the second display block 19, the display of the second display block 19 is stopped and the display of the third display block 20 is started. Also in the relationship between the third and fourth display blocks 20 and 21, the display is conducted in the same manner. As described above, in any display block, the priority is assigned to a block having a later vertical display start position. When the vertical display start positions of plural blocks coincide with each other (for example, in the case of CV1=CV2), priorities are assigned to the blocks by means of a hardware, and a display block having a higher priority is displayed. FIG. 4 shows an example of a screen display in the case where priorities are assigned in ascending order of the block numbers. The above-described control is conducted in the display position controller 8.

Next, the masking function will be described. FIG. 5 shows an example of a screen display using the masking function. A displayable area and undisplayable areas are set in a display screen so that RGB signals from the OSE are not outputted in the undisplayable areas. Using the first and second mask mode registers 13 and 14, a mask cancel position, and a mask set position are set respectively. On the basis of these values, the mask controller 15 recognizes the displayable area and the undisplayable areas, and then outputs to the output circuit 12 a signal which enables or disables the output circuit 12 to output RGB signals. When the vertical display start position of the display block is decremented or incremented by using the masking function, it is possible to conduct a scroll display.

Next, the multiline display will be described. FIG. 6 shows an example of a screen display in which the multiline display is conducted. For example, it is assumed that the hardware of the OSD has display blocks only for four lines and the multiline display is conducted when five or more lines are to be displayed. When the display of each display block is terminated, an interrupt occurs (hereinafter, such an interrupt is referred to as "CRT interrupt"). In the case where display areas of two display blocks are over-lapped and the display of the former display block is stopped in the middle, however, an interrupt does not occur. This interrupt causes a program for the multiline display to be executed, and the CPU conducts the following processes in accordance with the program execution. Firstly, the CRT interrupt occurs when the display of the first display block 18 is terminated. The vertical display start position of the first display block 18 is rewritten to be CV5. When the character size is to be changed, the contents of the character size register 3 is rewritten. Furthermore, code data stored in the display data RAM 5 are rewritten. When the vertical display start position reaches CV5 after the rewriting processes are terminated, the first display block 18 is displayed again. Similarly, with respect to the second to fourth display blocks 19 to 21, the above-mentioned data are rewritten by the CPU each time when the CRT interrupt occurs, thereby enabling the multiline display to be conducted.

The case where the conventional OSD processes a plurality of display tasks in which accesses from the CPU are asynchronously conducted will be considered. It is assumed that one display task is a channel selection display process in which a selected channel, a volume, etc. are displayed, and another display task is a teletext display process in which character data transmitted in a teletext are displayed. The first and second display blocks are previously set to conduct the channel selection display, and the third and fourth display blocks to conduct the teletext display. Since data of a teletext are transmitted in the form wherein the data are superimposed on a video signal, data of a teletext are always received. In accordance with the data, therefore, the CPU must sequentially write code data into the display data RAM 5 of the OSD.

When the teletext display is conducted by the multiline display of the third and fourth display blocks 20 and 21, for example, a display for a volume adjustment may be conducted simultaneously. If the display positions are over-lapped under this situation, there may arise a case where a desired display cannot be obtained depending on the vertical display start positions and the character sizes. FIG. 7 shows an example of a screen display in such a case. When the teletext display is conducted by the third and fourth display blocks 20 and 21, a channel call "2" is displayed. At this time, the relationship between the vertical display start positions is set to be the last-first control, and therefore the channel call cannot be displayed in an adequate manner. If the vertical display start position of the first display block 18 is made coincident with that of the fourth display block 21, the channel call "2" can be displayed without being hidden. However, this is an undesirable display method because, when the teletext display is scrolled, also the channel selection display must be scrolled similarly. As described above, when a desired display is to be conducted, the preset values of the registers must be previously considered. Moreover, the prior art system has a drawback that the process of the multiline display is so complicated that the load on the software is increased.

SUMMARY OF THE INVENTION

The invention has been conducted in order to solve the above-discussed problems. It is the primary object of the invention to provide a single chip microcomputer having a built-in OSD) which can simultaneously display on a desired display screen a plurality of display tasks that must be processed asynchronously.

The single chip microcomputer having a built-in OSD according to the first invention comprises a plurality of OSDs, and is configured so that the OSDs are independently controlled and output signals from the OSDs are mixed with each other. In the first invention, each display task is independently processed by the respective OSD, and therefore each display task is not affected by the other display task so that the display position and the character size can be set freely, whereby a desired display screen on which the display tasks are simultaneously displayed can be obtained.

The single chip microcomputer having a built-in OSD according to the second invention comprises a circuit for controlling priorities of display of display tasks, a circuit for controlling occurrence of interrupt in display task of the display tasks and a circuit for controlling existence of a mask in display of the display tasks, in addition to a circuit configuration of a conventional OSD.

The single chip microcomputer having a built-in OSD according to the third invention comprises the control circuits of the second invention, and is configured so that data of the display tasks are read out in plural times from a memory for storing display data of the display tasks, at timings which are shifted from each other.

In the second and third inventions, the priorities of display of plural display tasks are controlled, and occurrence of interrupt and existence of a mask in display of the display tasks are controlled. When these controls are combined, consequently, a desired display screen on which the display tasks are simultaneously displayed can be obtained.

The above and further objects and features of the invention will more fully be apparent from the following detailed description with accompanying drawings.

DESCRIPTION OF THE PREFERRED EMBODIMENTS

Hereinafter, the invention will be described specifically with reference to the drawings showing its embodiments.

(Embodiment 1)

Figure 8:
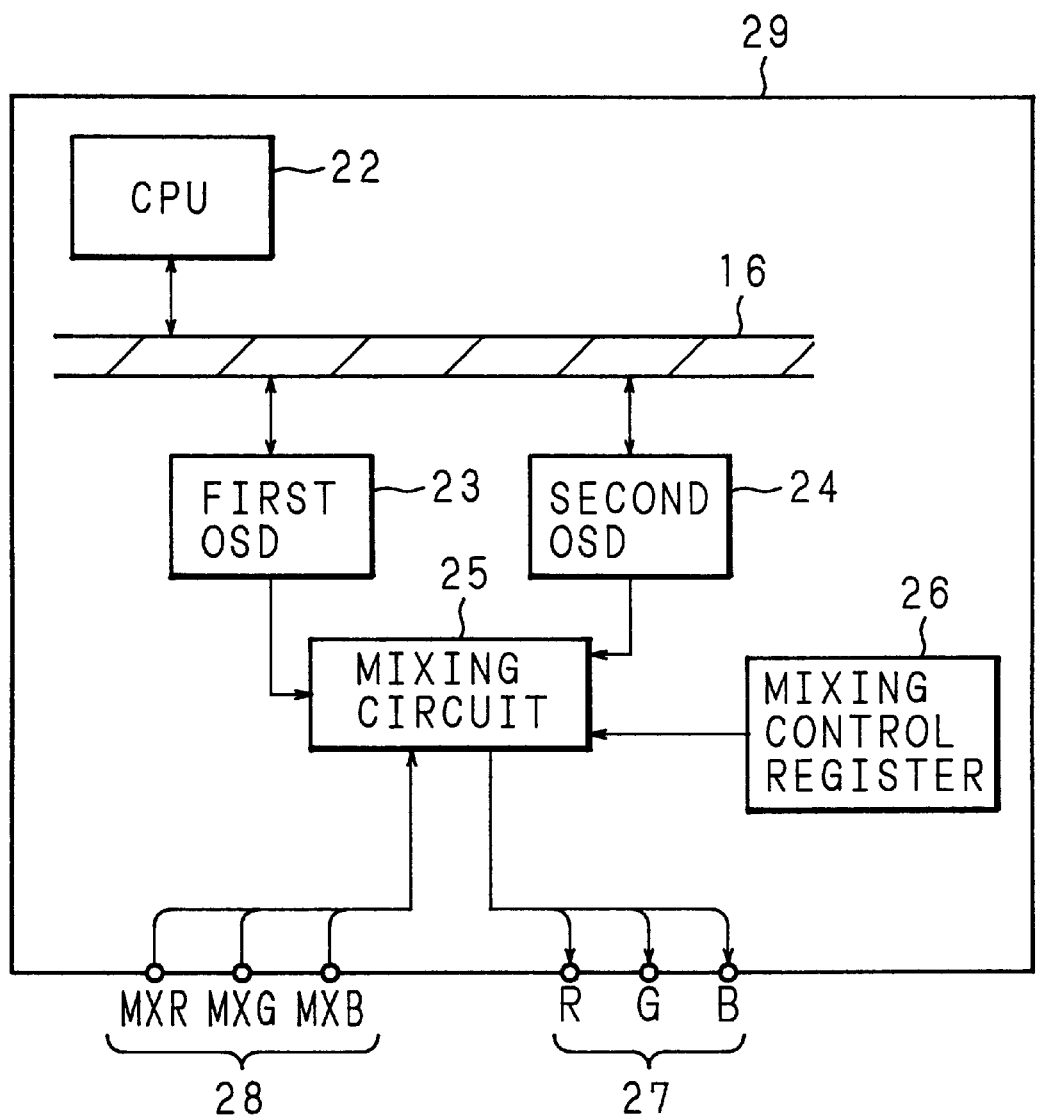
FIG. 8 is a block diagram showing the configuration of a single chip microcomputer of Embodiment 1 of the invention.

FIG. 8 is a block diagram showing the configuration of a single chip microcomputer of Embodiment 1 of the invention. In the figure, the reference numeral 29 designates the body of a microcomputer, and 16 designates a data bus. A CPU 22, and first and second OSDs 23 and 24 which are configured in the same manner as the prior art example (see FIG. 1) are connected to the data bus 16. The reference numeral 25 designates a mixing circuit for mixing output signals from the first and second OSDs 23 and 24, 26 designates a mixing control register for controlling the mixing circuit 25, 27 designates output terminals for RGB signals from the mixing circuit 25, and 28 designates input terminals for mixing signals supplied to the mixing circuit 25.

As described above, Embodiment 1 is configured so that the two OSDs 23 and 24 which are conventionally used are disposed in one chip, and each of the OSDs 23 and 24 can be accessed independently by the CPU 22 through the data bus 16. When the registers of the first and second OSDs 23 and 24 are assigned to different address areas and display interrupts from the first and second OSDs 23 and 24 are set as different factors (the interrupts are indicated by a CRT interrupt 1, and a CRT interrupt 2, respectively), the first arid second OSDs 23 and 24 can independently be controlled by the CPU 22.

Next, the operation will be described. It is assumed that the first OSD 23 processes the teletext display, and the second OSD 24 processes the channel selection display. Teletext data which are superimposed on a video signal are decoded by the CPU 22, and the contents of the registers and display data RAM 5 of the first OSD 23 are rewritten in accordance with the decoded data through the data bus 16. In response to the VSYNC, the HSYNC, the display clock which are supplied from the outside, the first OSD 23 outputs RGB signals. In the case of the channel selection display, similarly, the contents of the registers and display data RAM 5 of the second OSD 24 are rewritten by the CPU 22, and the second OSD 24 outputs RGB signals. The RGB signals from the first and second OSDs 23 and 24 are supplied to the mixing circuit 25. In accordance with the contents of the mixing control register 26 which are preset by the CPU 22, the mixing circuit 25 conducts controls such as a change of priorities of the RGB signals with respect to the output signals from the OSDs 23 and 24, and external mixing signals through the input terminals 28, and the permission and inhibition of the output of the RGB signals. The output signals (RGB signals) are outputted through output terminals 27 to the outside. It is a matter of course that the mixing circuit 25 and the mixing control register 26 may be configured in the OSD. Also in the alternative, the same effects can be attained.

According to the configuration described above, in each of the teletext display and the channel selection display, the setting of the display position, the character size, etc. can be conducted independently without being restricted by the other display task. Also in the case of the multiline display, moreover, in the teletext display, data of the registers and display data RAM 5 of the first OSD 23 are rewritten by means of the CRT interrupt 1, and, in the channel selection display, data of the registers and display data RAM 5 of the second OSD 24 are rewritten by means of the CRT interrupt 2.

In the above, Embodiment 1 has been described by illustrating the case of two display tasks (teletext display, and channel selection display). It is easily presumed that a configuration in which three or more OSOs are configured in one chip so as to cope with three or more display tasks can attain the same effects.

(Embodiment 2)

Figure 1:
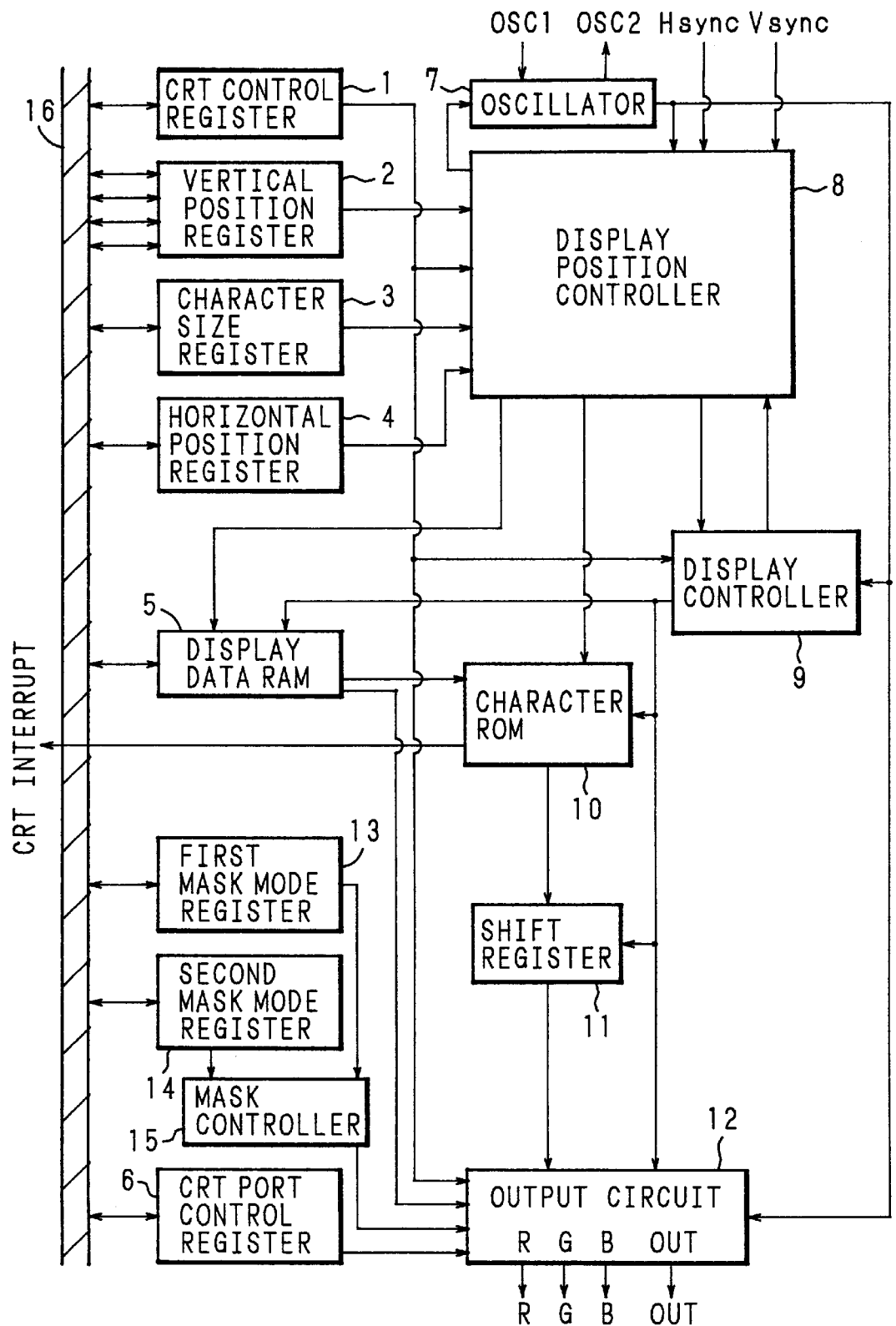
FIG. 1 is a block diagram showing the configuration of an on screen display device (OSD) incorporated in a prior art single chip microcomputer.
Figure 2:
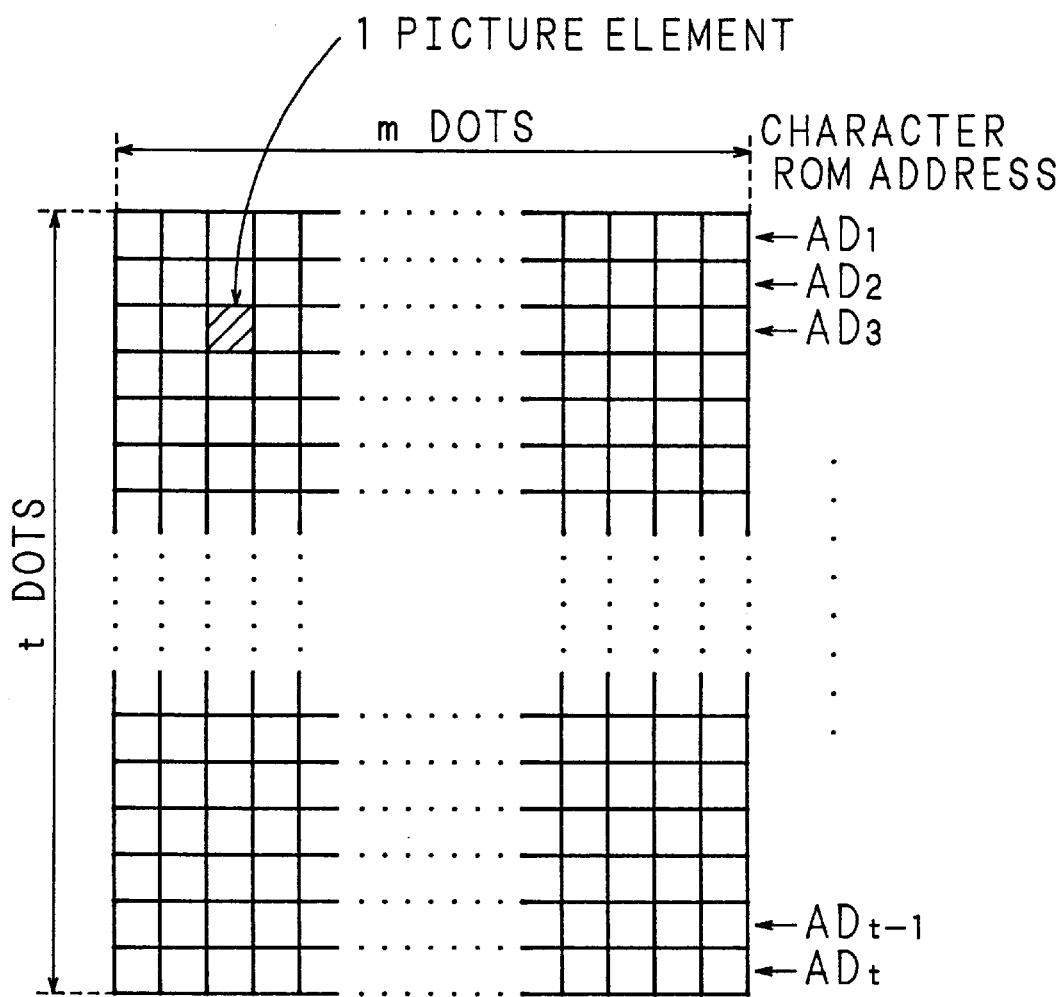
FIG. 2 is a diagram showing an example of the dot configuration of a font for one character.
Figure 3:
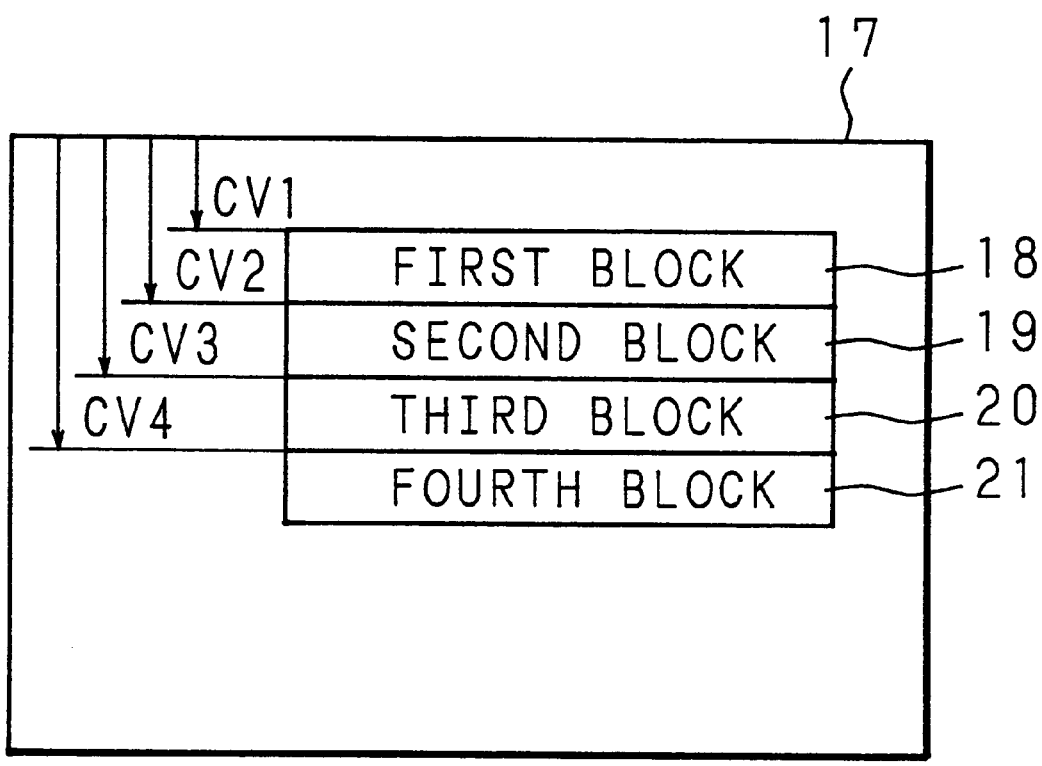
FIG. 3 is a diagram showing an example of a screen display which is obtained in the case where display blocks are overlapped with respect to the vertical display start positions of the display blocks of a conventional on screen display device (OSD)
Figure 4:
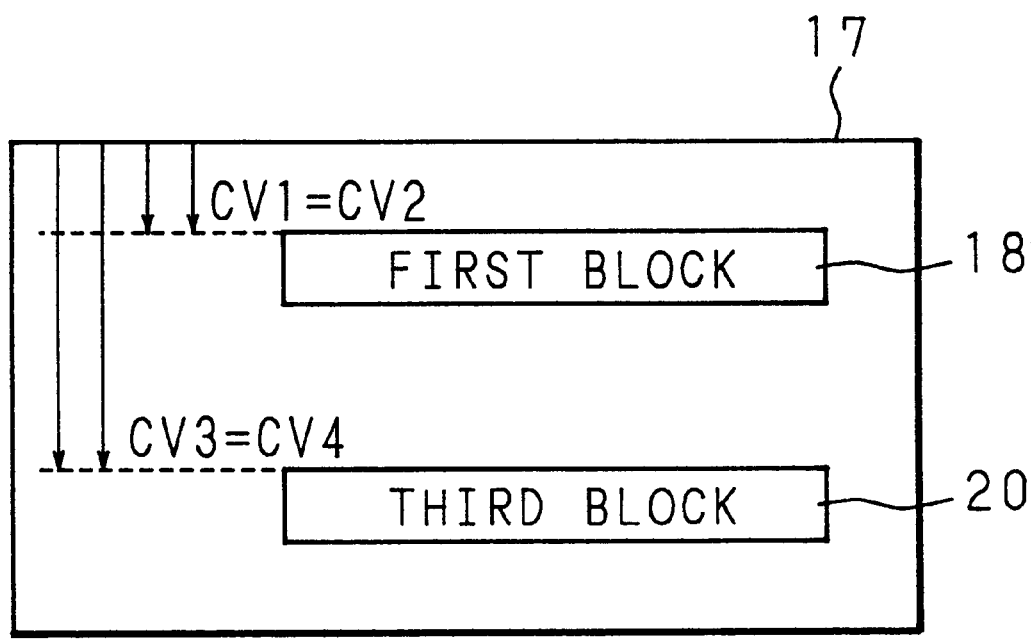
FIG. 4 is a diagram showing an example of a screen display which is obtained in the case where the vertical display start positions of the display blocks of a conventional on screen display device (OSD) coincide with each other.
Figure 5:
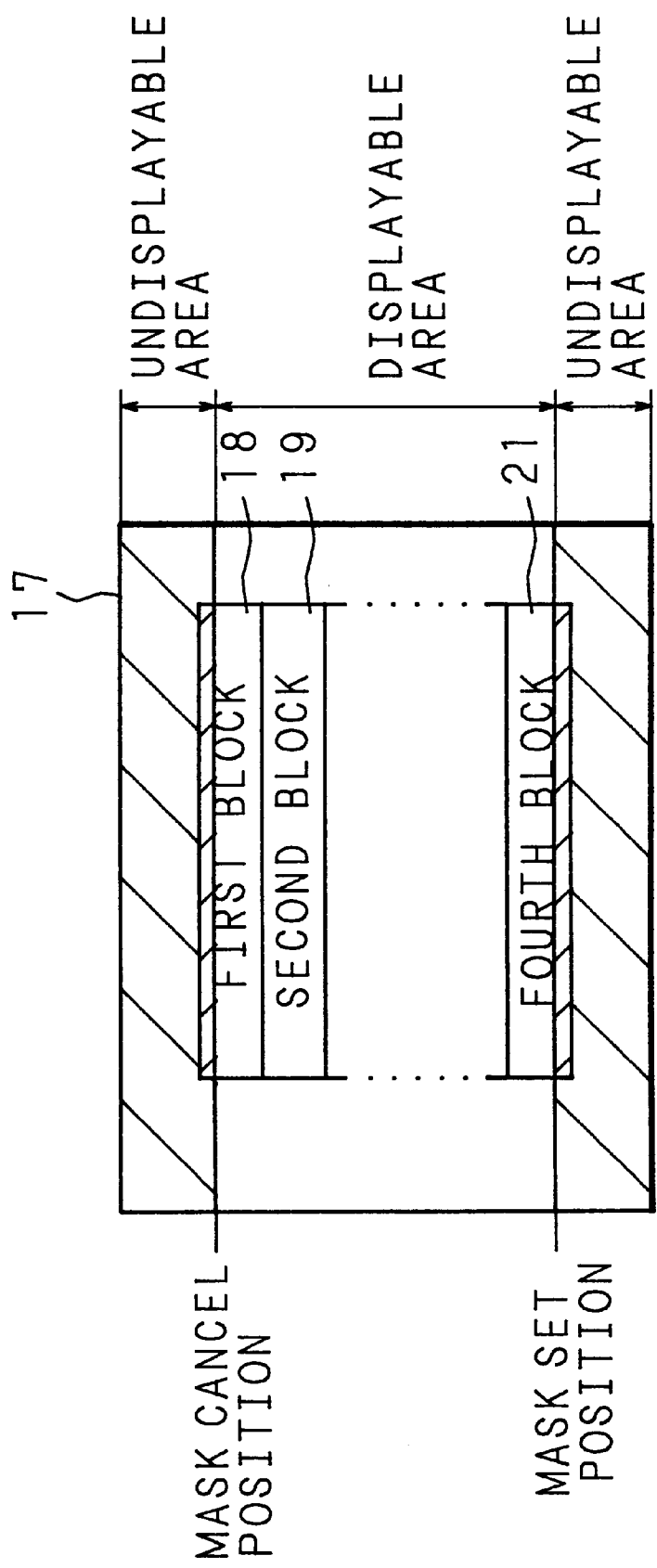
FIG. 5 is a diagram showing an example of a screen display which is obtained in the case where the masking function of a conventional on screen display device (OSD) is used.
Figure 6:
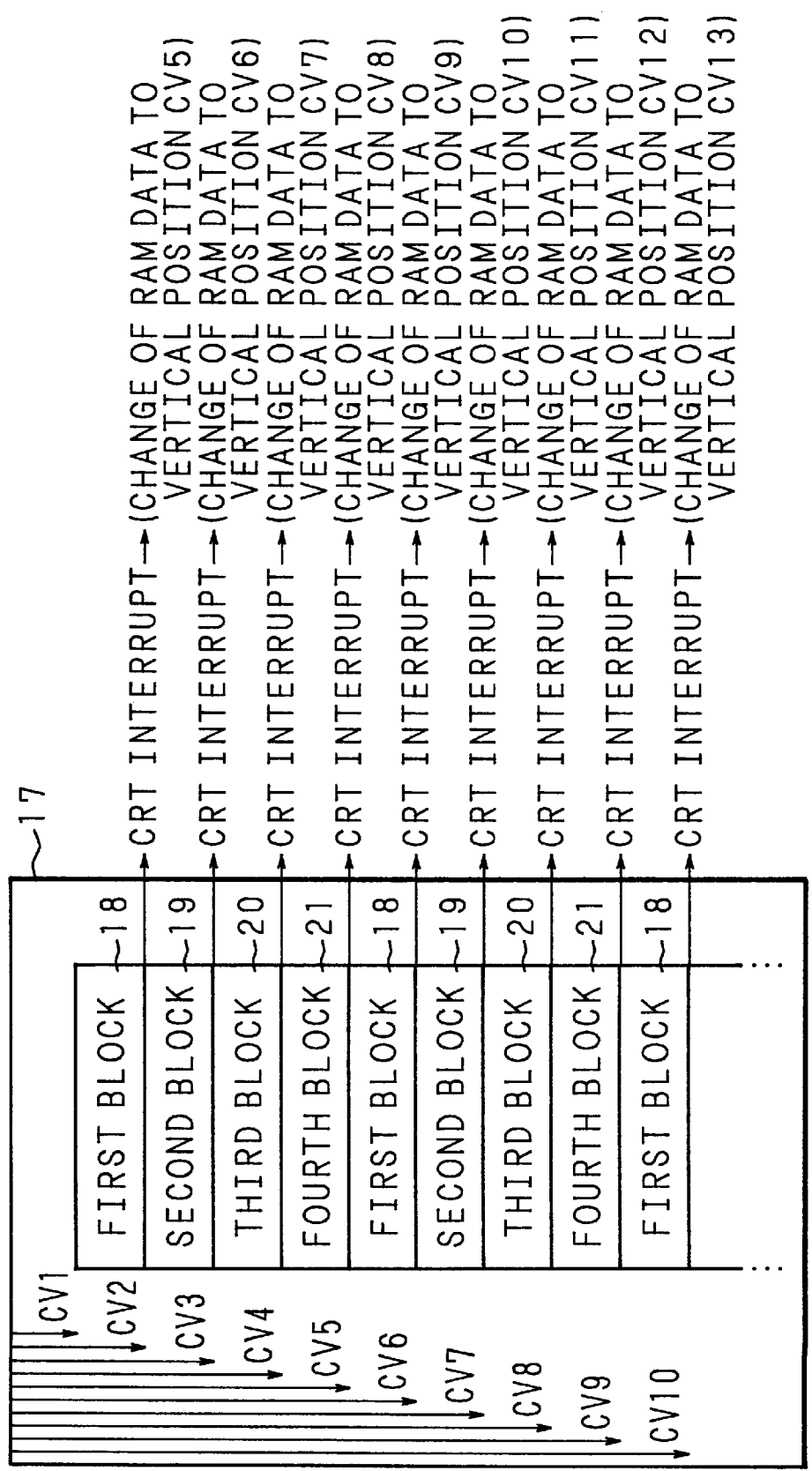
FIG. 6 is a diagram showing an example of a screen display in which the multiline display is conducted.
Figure 7:
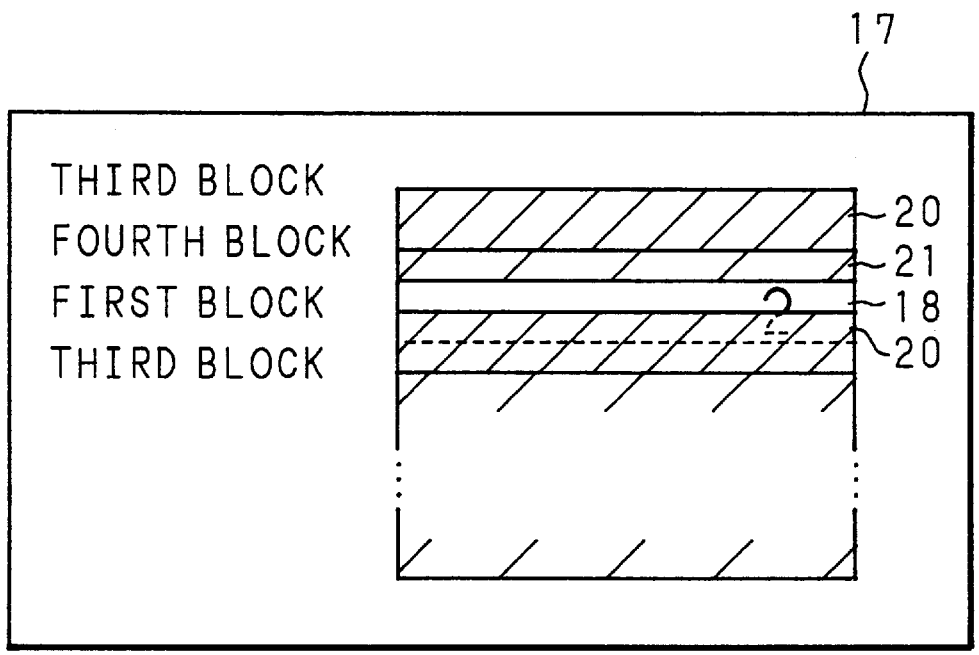
FIG. 7 is a diagram showing an example of a screen display which can be realized by a conventional on screen display device (OSD)
Figure 9:
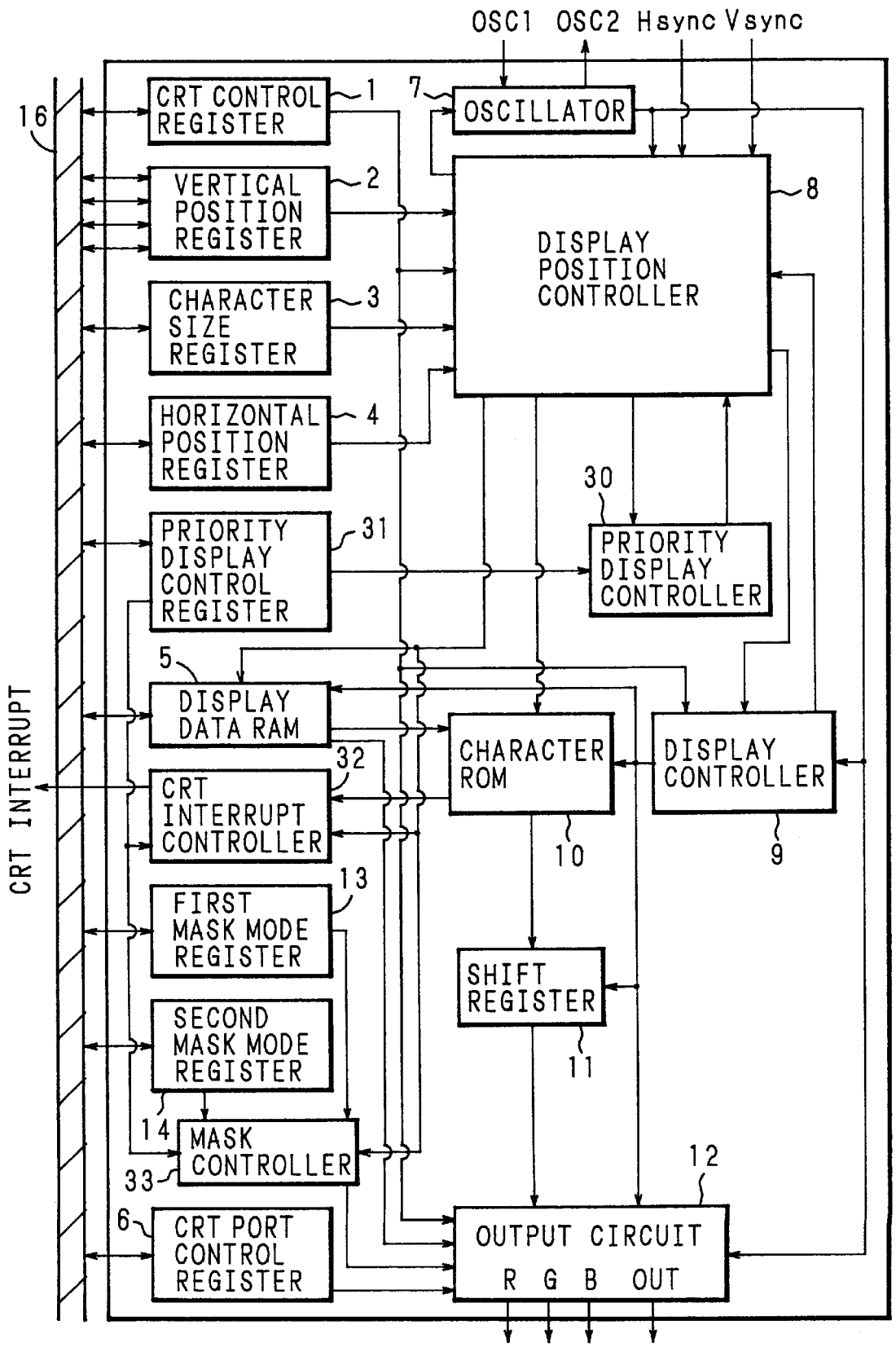
FIG. 9 is a block diagram showing the configuration of an on screen display device (OSD) incorporated in a single chip microcomputer of Embodiment 2 of the invention.

Next, Embodiment 2 of the invention will be described. FIG. 9 is a block diagram showing the configuration of an OSD incorporated in a single chip microcomputer of Embodiment 2. In FIG. 9, portions identical with those of FIG. 1 are designated by the same reference numerals and their description is omitted. The reference numeral 30 designates a priority display controller, 31 designates a priority display control register, 32 designates a CRT interrupt controller, and 33 designates a mask controller. The priority display control register 31 conducts the following settings: the setting of a block which preferentially displayed; the setting of a block in which the CRT interrupt occurs; and the setting of a block in which the masking is conducted, and that in which the masking is not conducted. When the bits of the register are set adequately, a plurality of display tasks can be displayed simultaneously. Selection information indicative of a block which is preferentially displayed is supplied to the priority display controller 30, that indicative of a block in which the CRT interrupt occurs is supplied to the CRT interrupt controller 32, and that of the masking function of each block is supplied to the mask controller 33.

Next, the operation will be described. At first, the priority display controller 30 will be described. The display position controller 8 originally controls the vertical display start positions of display blocks, and blocks are displayed in the last-first manner as described in conjunction with the prior art example. When the display start positions coincide with each other, a display block(s) to be displayed is determined in accordance with the priority relationship which is preset by means of a hardware. In the case where the first and second display blocks are selected as "preferentially displayed" blocks, even when the process reaches the vertical display start positions CV3 and CV4 of the third and fourth display blocks in the course of the display of the first and second display blocks, the display of the third and fourth display blocks is not started, and the first and second display blocks which have a higher priority remain to be displayed. When the display of the first and second display blocks is terminated, the third and fourth display blocks are displayed in the following manner. When the display of the third display block has not yet been terminated at this time under the assumption that the third display block has been displayed from the display start position CV3, the display of the third display block is started at some midpoint (see FIG. 10). In other words, the first and second display blocks can be displayed at superior positions with respect to the third and fourth display blocks. Since both the first and second display blocks are "preferentially displayed", they are set, so that they are subjected to the last-first control and, at the same display start position, one of them is preferentially displayed. As described above, in addition to the conventional priority relationship (the last-first, etc.) of display blocks, the priority display controller 30 can set a novel priority relationship on the basis of the contents of the priority display control register 31.

Figure 10:
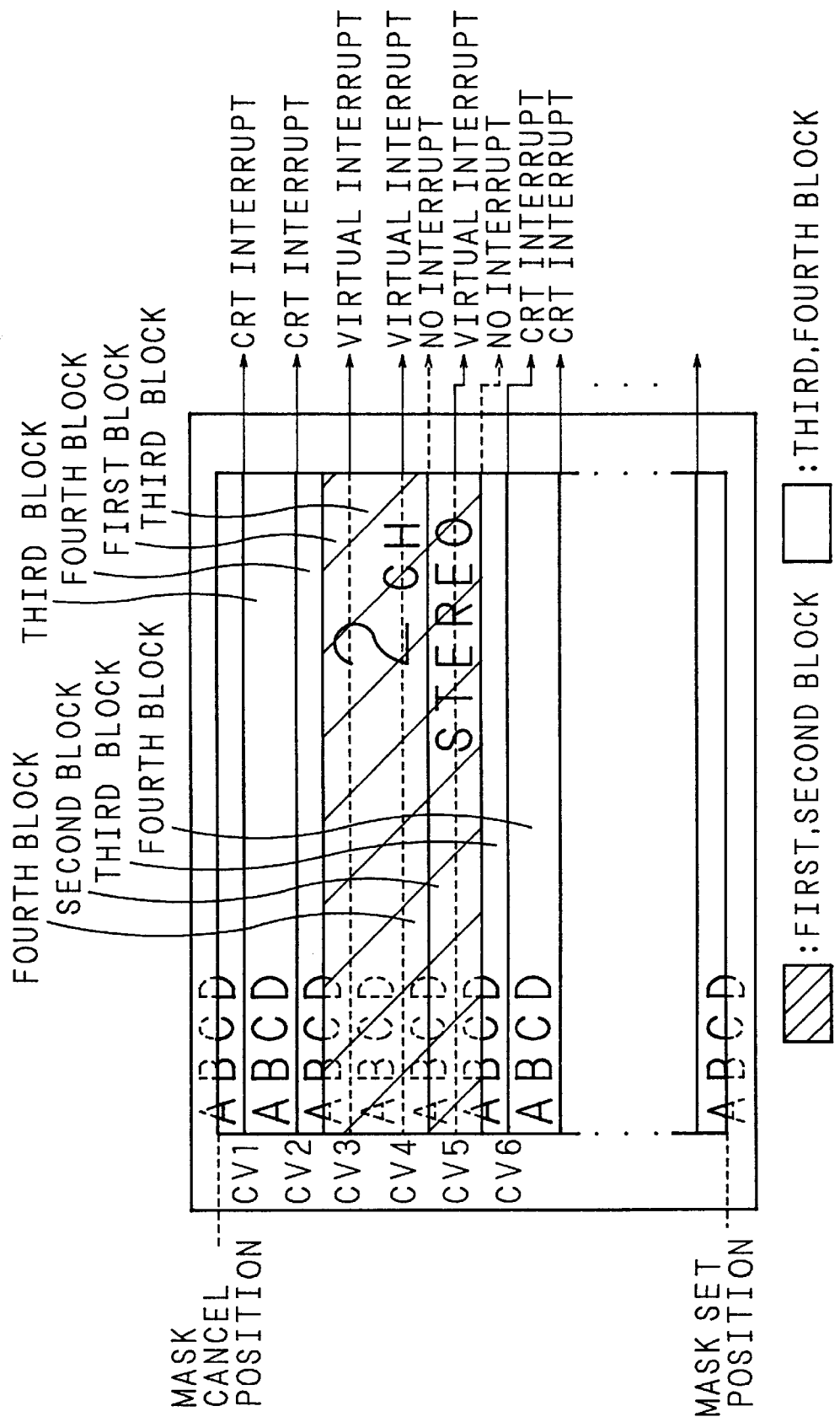
FIG. 10 is a diagram showing an example of a screen display which can be realized by Embodiment 2.

Next, the CRT interrupt controller 32 will be described. In the prior art, with respect to all display blocks, the CRT interrupt occurs at the timing when the display of a displayed block is terminated. In Embodiment 2, the priority display control register 31 sets occurence/nonoccurrence of the CRT interrupt for each block, and also occurrence/nonoccurrence of a virtual interrupt. The virtual interrupt is an interrupt which, when an undisplayed block is assumed to be displayed on a screen, is produced at the timing when the virtual display is terminated. With respect to a block in which the "occurrence" of the virtual interrupt is set, therefore, the interrupt position is determined depending on the vertical display start position, regardless of whether the block is actually displayed on the screen or not. In accordance with information of the registers, the CRT interrupt controller 32 controls the CRT interrupt and the virtual interrupt which are produced for each block. FIG. 10 shows interrupt positions in the case where the first and second display blocks are set to be "nonoccurrence" of the CRT interrupt and the third and fourth display blocks are set to be "occurrence" of the virtual interrupt. According to this configuration, the CRT interrupt can be controlled so as not to occur in the first and second display blocks, and to occur only in the third and fourth display blocks.

Figure 11:
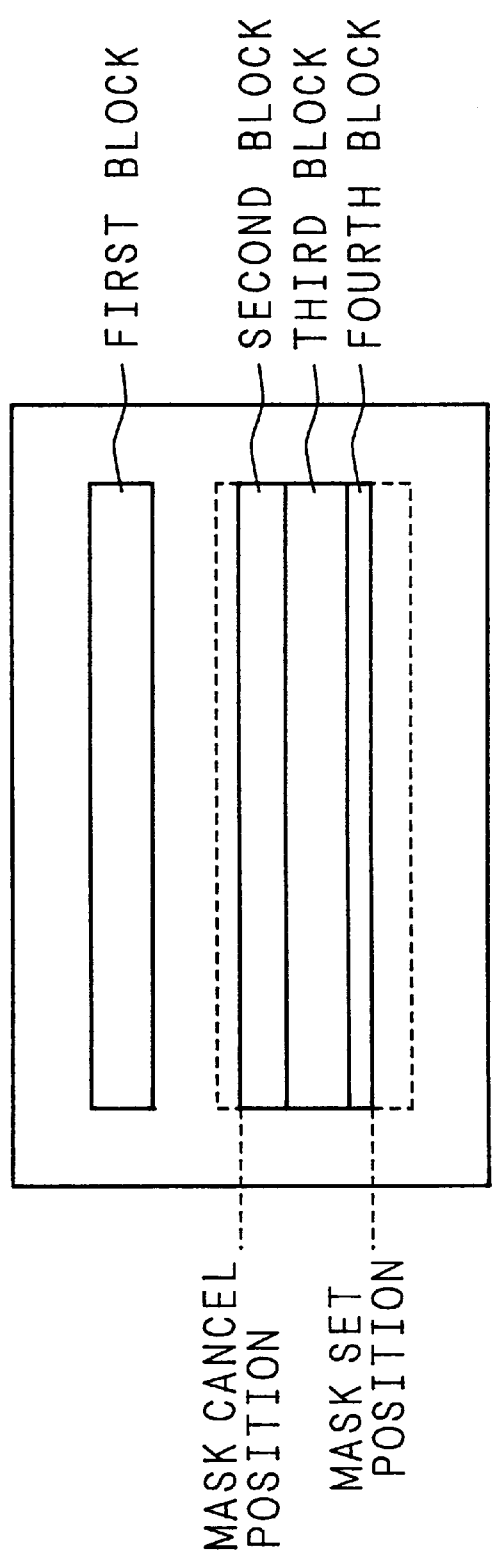
FIG. 11 is a diagram showing an example of a screen display which can be realized by Embodiment 2.

Next, the mask controller 33 will be described. For each block, the setting of whether the masking is conducted or not is done by the priority display control register 31. On the basis of the information of the register, the mask controller 33 issues a control signal to the output circuit 12 so that only a block(s) to be "masked" is not displayed in a masking area, or RGB signals are not outputted. Depending on blocks, the output circuit 12 executes the output/nonoutput of RGB signals in the masking area. FIG. 11 shows an example of a screen display in the case where the third and fourth display blocks are set to be "masked" and the first and second display blocks are set to be "not masked".

As described above, the configuration in which the priority display control register 31, the priority display controller 30, the CRT interrupt controller 32, and the mask controller 33 are additionally disposed in a conventional OSD can conduct screen displays which are different from those of the prior art. For example, it is assumed that, as shown in FIG. 10, the channel selection display is conducted in the first and second display blocks, and the teletext display is conducted in the third and fourth display blocks while a multiline display of 15 lines is done on the basis of the information amount to be displayed. At this time, the bits of the priority display control register 31 are set so that the first and second display blocks are "preferentially displayed", "nonoccurrence of the CRT interrupt and the virtual interrupt", and "not masked", and the third and fourth display blocks are "nonpreferentially displayed", "occurrence of the CRT interrupt and the virtual interrupt", and "masked". According to this configuration, data of the teletext which are continuously transmitted are decoded by the CPU, and the code data of the display data RAM 5 of the OSD, and the bits of the registers which relate to the third and fourth display blocks are set. The third and fourth display blocks are alternately displayed, and the 15 lines of each block are displayed. Thereafter, the CRT interrupt occurs. Consequently, the multiline display is conducted by rewriting the display data RAM 5 and the registers each time when the interrupt occurs. Since also the masking function is executed, the scroll display can be conducted as described above. When a viewer asynchronously issues instructions for the channel selection display during the process of the teletext display and a channel call or the like is to be displayed, the setting is done so that an interrupt is caused by a factor which is different from the display interrupt and the CPU conducts the display process on the first and second display blocks. The teletext display and the channel selection display can simultaneously be done on the display screen. After the setting is completed, the CPU again starts the teletext display process.

In the above, the first and second display blocks are set so that the display interrupt does not occur. When an interrupt is caused by a factor which is different from the display interrupt, the multiline display can be conducted both in the teletext display and the channel selection display.

(Embodiment 3)

Figure 12:
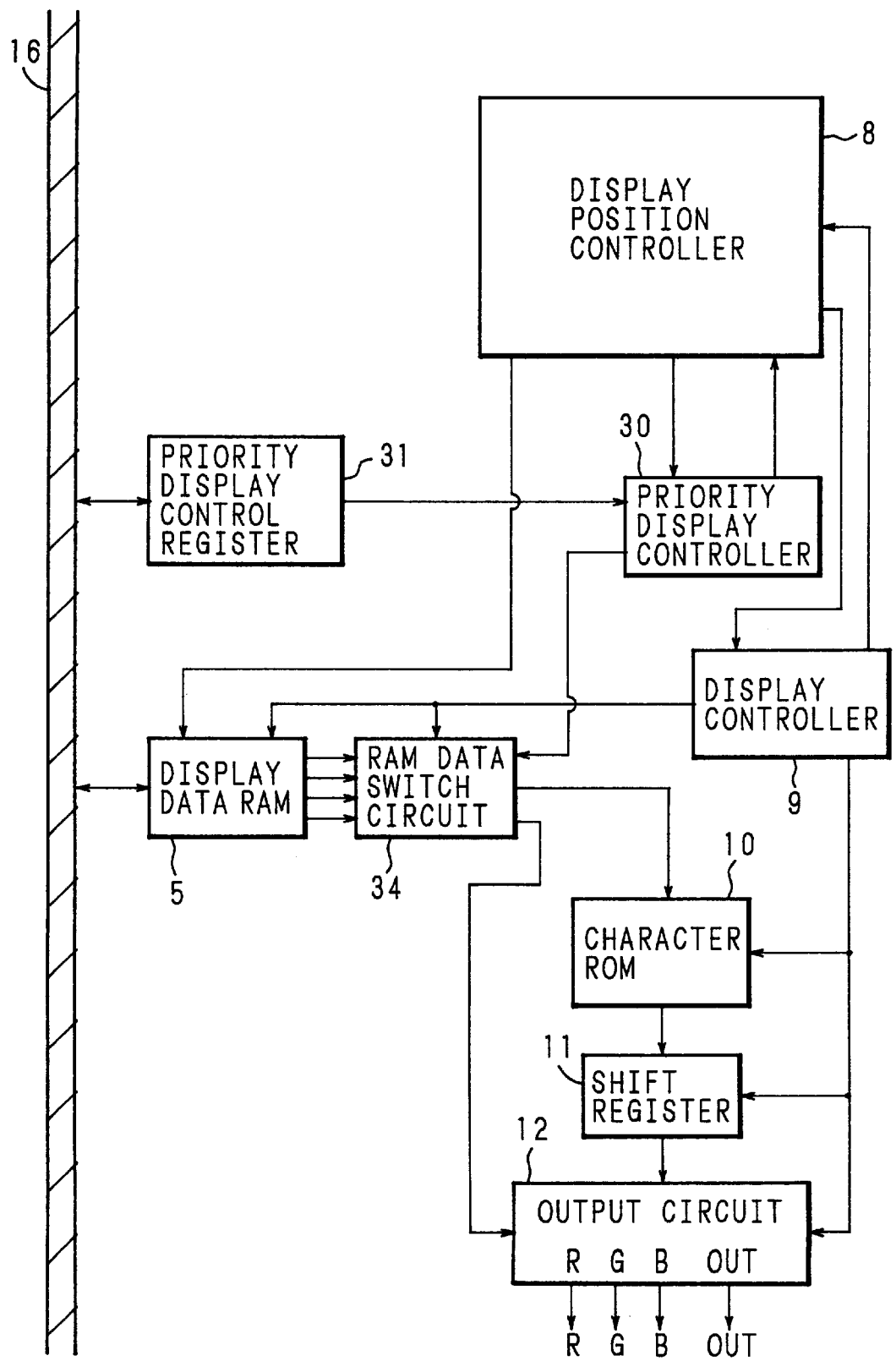
FIG. 12 is a block diagram showing a part of the configuration of an on screen display device (OSD) incorporated in a single chip microcomputer of Embodiment 3 of the invention.

Next, Fmbodiment 3 of the invention will be described. FIG. 12 is a block diagram showing a part of the configuration of an OSD incorporated in a single chip microcomputer of Embodiment 3. Portions which are not shown in FIG. 12 are identical in configuration with those of Embodiment 2 (FIG. 9). Furthermore, portions identical with those of FIG. 9 are designated by the same reference numerals and their description is omitted. Embodiment 3 has a configuration in which a RAM data switch circuit 34 for selecting data read out from the display data RAM 5 is added to the above-described configuration of Embodiment 2.

Next, the operation will be described. For each horizontal scanning line, the display position controller 8 determines which block(s) should be displayed. In the case where one block is displayed, the display is started from the first character in the horizontal direction. In order to conduct the display, the following processes:

1: readout of code data from the display data RAM 5;
2: output of font data from the character ROM 10;
3: setting of the font data in shift register 11; and
4: output of RGB signals from the output circuit 12 in synchronization with the display clock are repeated in time series for each character in the horizontal direction, thereby conducting the display of one scanning line.

In Embodiment 3, the display data RAM 5 is not subjected to the process of reading out only code data of blocks which are to be displayed, but is subjected to a twice reading process in which the reading of a preferentially displayed block, and that of a nonpreferentially displayed block are shifted in timing from each other. From the readout data, the RAM data switch circuit 34 selects data of blocks which are to be displayed. Among the selected data, character code data are supplied to the character ROM 10, and color code data and attribute code data are supplied to the output circuit 12. In place of the twice reading process, a process in which code data of all blocks are read out and then selectively output may be employed. Also in this alternative, the same effects can be attained.

As described above in detail, the single chip microcomputer of the invention incorporates a plurality of OSDs which can independently be controlled, or has a function of controlling priorities of display of display tasks, and occurrence of interrupt and existence of a mask in display of the display tasks. Therefore, a plurality of display tasks which must be processed asynchronously can be displayed simultaneously on a display such as a CRT under a desired screen configuration, whereby a screen display which is provided with a high level function and reduced in cost can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A single chip microcomputer having a built-in on screen display device which conducts a control for simultaneously displaying on a display a plurality of display tasks which are to be processed asynchronously, comprising:

first controlling means for controlling priorities of said display tasks during display operation;

second controlling means for controlling occurrence of interrupts in display in accordance with the priorities of said display tasks; and third controlling means for controlling existence of a mask in display in accordance with the priorities of said display tasks.

2. A single chip microcomputer having a built-in on screen display device according to claim 1, wherein said plurality of display tasks include a teletext display task, and a channel selection display task, and the channel selection display has precedence over the teletext display.

3. A single chip microcomputer having a built-in on screen display device which conducts a control for simultaneously displaying on a display a plurality of display tasks which are to be processed asynchronously, comprising:

first controlling means for controlling priorities of said display tasks during display operation;

second controlling means for controlling occurrence of interrupts in display in accordance with the priorities of said display tasks;

third controlling means for controlling existence of a mask in display in accordance with the priorities of said display tasks;

storing means for storing data of said display tasks; and reading means for reading out data of display tasks from said storing means at timings which are shifted from each other.

4. A single chip microcomputer having a built-in on screen display device according to claim 3, further comprising:

means for selecting data to be displayed, from data of display tasks which are read out by said reading means.

* * * * *